United States Patent [19]

Kühling

[11] Patent Number: 4,851,647
[45] Date of Patent: Jul. 25, 1989

[54] PROCESS FOR WELDING BUTT-JOINTED PLASTIC TUBES AND WELDING DEVICE FOR PERFORMING THE PROCESS

[75] Inventor: Siegfried Kühling, Lohne, Fed. Rep. of Germany

[73] Assignee: Firma Riesselmann & Sohn, Lohne, Fed. Rep. of Germany

[21] Appl. No.: 226,545

[22] Filed: Aug. 1, 1988

Related U.S. Application Data

[63] Continuation of Ser. No. 34,796, Apr. 3, 1987, abandoned.

[30] Foreign Application Priority Data

Apr. 4, 1986 [DE] Fed. Rep. of Germany ....... 3611192

[51] Int. Cl.$^4$ ............................................. B29C 65/34
[52] U.S. Cl. .................... 219/535; 156/158;
156/274.2; 156/304.2; 156/304.3; 156/304.6;
156/379.7; 428/65; 219/536; 403/270
[58] Field of Search .................. 156/158, 273.9, 274.2,
156/274.4, 304.2, 304.3, 304.6, 379.7, 503;
219/541, 544, 551, 535, 536; 428/65, 66;
285/41, 423; 403/270, 294

[56] References Cited

U.S. PATENT DOCUMENTS

| | | | |
|---|---|---|---|
| 2,744,655 | 5/1956 | Vnuk | 156/273.9 |
| 4,266,997 | 5/1981 | Lippera | 156/158 |
| 4,313,053 | 1/1982 | Sturm | 156/274.2 |
| 4,455,482 | 6/1984 | Grandchlèment | 156/379.7 |
| 4,689,108 | 8/1987 | Barry, Jr. et al. | 156/304.6 |

FOREIGN PATENT DOCUMENTS 336980 4/1959 Switzerland ..................... 156/274.2

Primary Examiner—Michael Wityshyn
Attorney, Agent, or Firm—Collard, Roe & Galgano

[57] ABSTRACT

In order to weld butt-jointed plastic tubes, a welding element with a wire coil for electrical resistance heating is positioned between the abutting tube ends. The tube ends are pressed to each other while at the same time the welding device is heated to welding temperature. Lastly, the tube ends are held together until the welded area has hardened by cooling. The welding device is constructed in the form of an annular disc the external diameter of which is approximately equal to the external diameter of the tubes and the internal diameter of which is approximately equal to the nominal internal diameter of the tubes. A heating wire coil spirals around the geometric center of the annular disc, and is positioned on the two annular disc surfaces that come into contact with the tube ends.

3 Claims, 5 Drawing Sheets

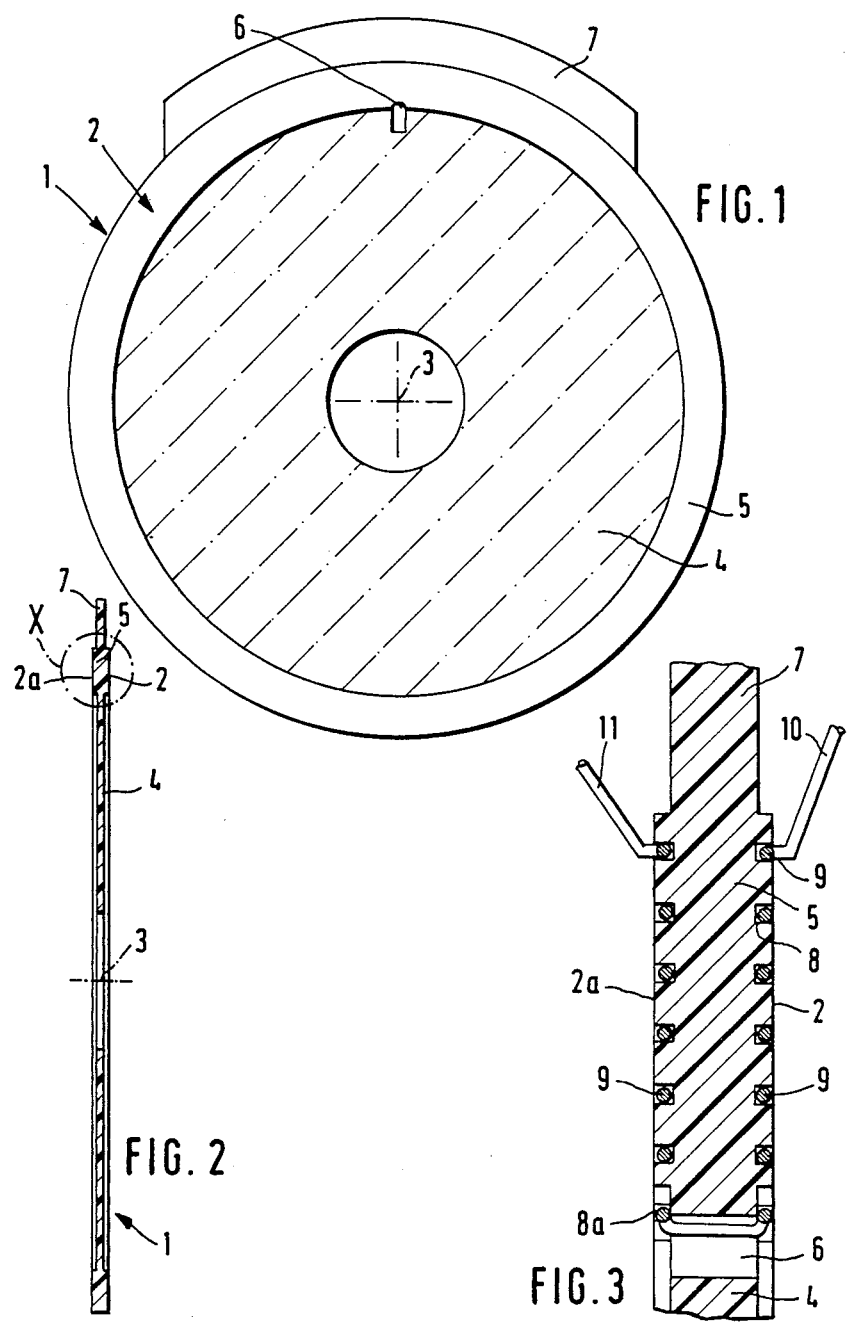

PROCESS FOR WELDING BUTT-JOINTED PLASTIC TUBES AND WELDING DEVICE FOR PERFORMING THE PROCESS

REFERENCE TO RELATED APPLICATIONS

This is a continuation application of application Ser. No. 034,796, filed Apr. 3, 1987, for "Process For Welding Butt-Jointed Plastic Tubes and Welding Device For Performing the Process", now abandoned.

The invention relates to a process for welding butt-jointed plastic tubes and a welding device for performing the process.

It is known how to butt-weld plastic tubes by pressing the abutting tubes for a short time on a welding reflector that has been heated to a predetermined temperature. The tube ends are thereby heated, the tube material becomes soft, and the joint is created by joining the tube ends lifted from the welding reflector while maintaining a predetermined clamping pressure.

The temperature needed for perfect welds is maintained as precisely as possible. However, this is relatively difficult in butt-welding with a welding reflector. The temperature of the welding reflector can be predetermined and maintained with a relatively high degree of precision, but the temperature of the tube ends cannot. The tube ends heated by being pressed on the welding reflector must therefore be positioned and pressed together as quickly as possible, since the plasticity of the heated tube ends quickly diminishes through cooling.

When the heating reflector is withdrawn from the seam between two tube ends, the tubes to be welded often become misaligned. For this reason, the tubes must be positioned as precisely as possible and must be maintained in this aligned position even while the tubes are being pressed together after the withdrawal of the welding reflector.

In practice, the positioning is maintained through the use of relatively expensive equipment for holding the tubes together and pressing them against each other. Because of this problem, the butt welding of plastic tubes is being increasingly replaced by sleeve or muff-butt welding, which is more expensive but is easier to do. Here a welding tool in the form of an electrically heatable muff or sleeve is slipped over the joint between two tubes that are to be welded together and to which the muff can easily be welded. However, muff-joint welding requires expensive preparatory work that can be eliminated in butt-welding; muff-butt welds, however, are of better quality, because the actual welding is easier to control as regards welding temperature, clamping pressure, and positioning.

Accordingly, it is an object of the invention to improve the butt-welding of plastic tubes in such manner that optimum weld quality is ensured with simplified handling.

This object is attained according to the invention by positioning a welding tool with a wire winding for electrical resistance heating between the tube ends being joined, while at the same time heating the welding tool to the welding temperature and holding the tube ends together until the welded area hardens through cooling.

Use of a welding reflector can be dispensed with as a result of the use of the inventive welding tool that can be positioned between the tube ends to be welded together. The tube ends can be positioned in final position and simply pressed together, something that can even be done manually if necessary. The inserted welding tool consists of a substance that welds the tube ends to be butt-welded when it is heated to welding temperature.

For an optimum connection, the welding tool consists of the same substance as the tubes. When the welding tool is heated by an electrical current to the welding temperature, the abutting tube ends become soft together with the welding tool and the joint is created by pressing them together. The welds are homogeneous and durable. Welding is easier than with a welding reflector, since the temperatures can be maintained very simply.

In accordance with the invention, a welding tool for executing the process is provided which is characterized by the fact that it is structured as a ring shaped disc having an external diameter approximately equal to the external diameter of the tubes and an internal diameter approximately equal to the nominal width of the tubes.

An annular disc can advantageously be positioned between the tube ends. The external surfaces of the disc lie flush with the surfaces of the tube ends. Even after welding, the effective length of the tubes is diminished to only a small extent, since only a small bulge is created at the weld joint by the pressing together of the tube ends.

In order that the disc placed between the tube ends, and thus also the tube ends adjacent to the disc, can be heated to welding temperature, provision is made for a heating wire coil to spiral around the geometric center of the disc on both surfaces that come into contact with the tube ends. The advantage of this arrangement of the heating wire coil is that the heating wire is evenly heated upon contact with the welding current and thus the surfaces of the disc that are in contact with the tube ends to be welded are also brought to welding temperature and heat transmitted to the adjoining tube ends. No overheated areas are created. The coil is positioned in such manner that it begins on one side of the disc and spirals inward, where it travels to the other side of the disc and then spirals outward. The beginning and end of the wire that spirals along the disc sides protrude from the disc, so that they can be used for the connecting of the welding current source.

So that the heating wire coil on the disc surfaces can be attached to the sleeve sides, the sleeve sides have molded holders for the heating wire coil. Examples of holders include grooves that follow the course of the wire and in which the wire can be retained or gripped. This allows the heating wire coil to be easily installed or housed. For example, the disc can be rotated under a wire feed and the wire can then be continuously fed to the rotating sleeve and pressed into the sleeve groove that is to be filled with the wire.

Obviously, the disc must consist of a substance that softens when heated. Preferably, it is of the same plastic as the tubes that are to be welded.

It is particularly advantageous if the disc is inserted into a saddle having the shape of a bushing segment. The saddle can be positioned in the area of the ends of two aligned tubes, the disc inserted into the saddle section being then inserted into the joint between the pipe ends once the saddle portion is positioned on the aligned tubes. The saddle thereby performs the advantageous function of positioning the disc between the pipe ends to be welded together and holding them in this position until the tube ends have been pressed together and grip the disc between them. At the same time the saddle maintains in alignment the tube ends to be welded.

The saddle can also accept and support contact elements which are connected to the ends of the heating wire coils mounted in the disc. The connection to a welding set dispensing the welding current is thereby easy to handle and is reliable.

Most advantageously, the saddle encloses the disc in a circumference greater than 180°. The saddle can thereby act like a clamp on the tube ends that are to be joined holding the tubes in perfect alignment during the welding process. Additional holding devices for the tubes during the welding are not necessary, since the saddle provides sufficient support for the tubes, as well.

The welding tool is also characterized by the fact that the disc and the saddle section have reciprocal connection elements engageable with one another. The disc can thereby be constructed separate from the saddle section, with the advantage that winding the heating wire on the disc is easier. The completed disc can then be connected with the saddle section to form a welding tool that is ready for use.

Preferably, at least one projection projects radially from the disc and at least one recess accepts the projection in the saddle, the projection and recess thereby cooperating to act as connection components. The recess and the projection fit together, so that it is easy to assemble the disc and the saddle; no attention need be paid to special reciprocal alignment and positioning, since the parts fit into each other only if the projection and recess fit together.

Advantageously, the connection is constructed in such manner that the projection projects up through the recess and the edges of the projection projecting out of the recess are connected with the saddle. This connection can be implemented by gluing or welding. In the case of welding, for example, a heated ridge is pressed onto the projecting edge of the projection until it has been softened and pressed out flat and, after cooling, the connection between the projection and saddle is completed.

Since the saddle section is intended to orient and hold together without misalignment the tube ends that are to be welded without misalignment, its inner walls rest on the outer sleeve surface of the tube ends. Since during welding the tube ends are pressed together, the material, softened by the heating, flows out of the welding groove to form a weld bead, as is customary in buttwelding. In order to facilitate the formation of a bead despite the close proximity of the saddle to the upper surface of the tube ends, the inner casing surface of the saddle desirably has a groove that accepts the perimeter edge of the sleeve, the width of which groove exceeds the thickness of the sleeve. Softened material pressed out of the welding groove between the tube ends can escape into this groove, so that a clean weld bead can form between the tube ends.

The substance used for the sleeve and the saddle section is preferably polyethylene, a substance that is customary for tubes, particularly gas and water pipes.

The sleeve and the saddle can be manufactured in large quantities in a simple extrusion process. Since tube sizes are standardized, appropriate sleeves with saddle can be produced directly in appropriate sizes.

Other objects and features of the present invention will become apparent from the following detailed description considered in connection with the accompanying drawings, which disclose one embodiment of the invention. It is to be understood that the drawings are to be used for the purpose of illustration only, and not as a definition of the limits of the invention.

In the drawings, wherein similar reference characters denote similar elements throughout the several views:

FIG. 1 is a front view of a disc in the prefabrication stage of a welding instrument embodying the present invention;

FIG. 2 is a cross-sectional view of the disc shown in FIG. 1;

FIG. 3 is an enlarged, fragmentarily-illustrated sectional view of the detail X, highlighted in FIG. 2;

Figure 4:
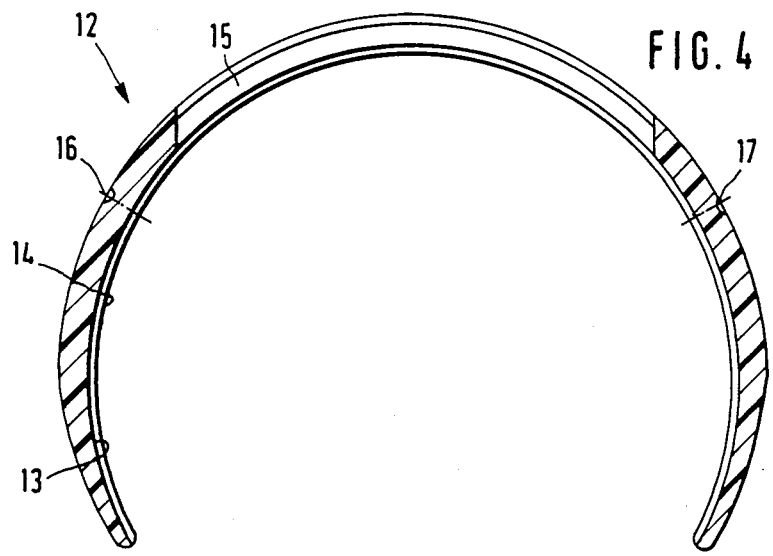
FIG. 4 is a cross-sectional view of a prefabricated saddle element.

Referring now in detail to the drawings, FIGS. 1 and 2 illustrate a disc 1 manufactured from extruded plastic, the outer circular portion of which forms two ring side surfaces 2, 2a which can be wrapped with the heating wire coil spiraling around the geometric center 3 of the disc. After the heating wire coil is in place, the crosshatched central portion 4 of the disc is cut away, leaving a ring or annular disc 5 with wrapped ring side surfaces 2a.

In the transitional area between the center disc area 4 to be cut away and the ring side surfaces 2 and 2a, there is a breach or slot 6, which makes it possible to lead the wire of the coil from the ring side surface 2 of annular disc 5, to the opposite ring side surface 21 of the annular disc and there continue the wrapping of the coil from inside to outside.

The top edge of the disc has a projection 7. The projection serves to attach the annular disc to a following saddle or saddle section, to be explained in greater detail hereinafter.

As shown in FIG. 3, there are grooves 8 in disc side surfaces 2 and 2a of annular disc 5, which grooves 8 run spirally and correspond to the spiral arrangement of the heating wire coil. A heating wire 9 is installed in grooves 8. The starting point 10 of the wire begins in the area of the outer circumference of annular disc 5 and spirals on the plane of disc side surfaces 2 until it reaches slot 6. The slot is positioned in such manner that it extends to the lowest groove, so that the wire can be led through slot 6 to the opposite groove 8a and spiral back, following one of the grooves in ring disc side surface 2a until the wire end 11 is free. A disc 1 wrapped in this way is finally shaped into annular disc 5 by the removal of the center section 4.

Figure 5:
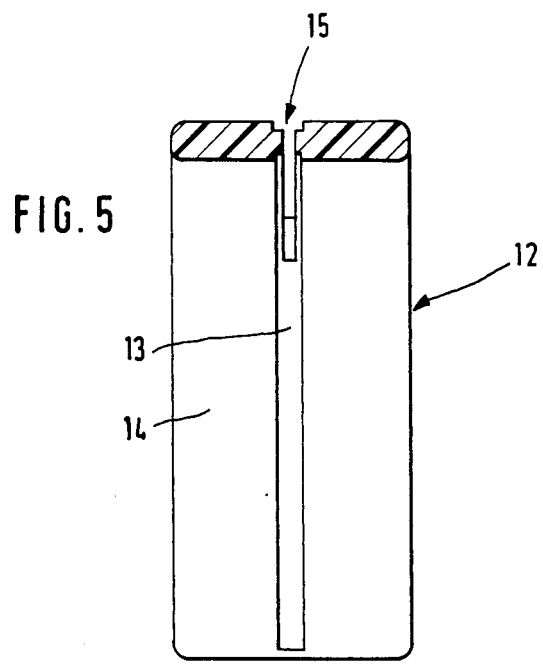
FIG. 5 is a longitudinal sectional view of the saddle element shown in FIG. 4.

The wrapped annular disc 5 is inserted into a saddle or saddle element or section, shown in FIGS. 4 and 5. The saddle 12 encloses the annular disc in a perimeter that is larger than 180°. The annular disc is inserted in a channel 13 on the inner surface 14 of the saddle, with the projection 7 of the annular disc extending through the recess 15 of the saddle. The saddle has holes 16 and 17 which can accept the free wire ends 10 and 11 in the annular disc held in the saddle, so that wire ends 10 and 11 protrude out of the saddle.

Figure 6:
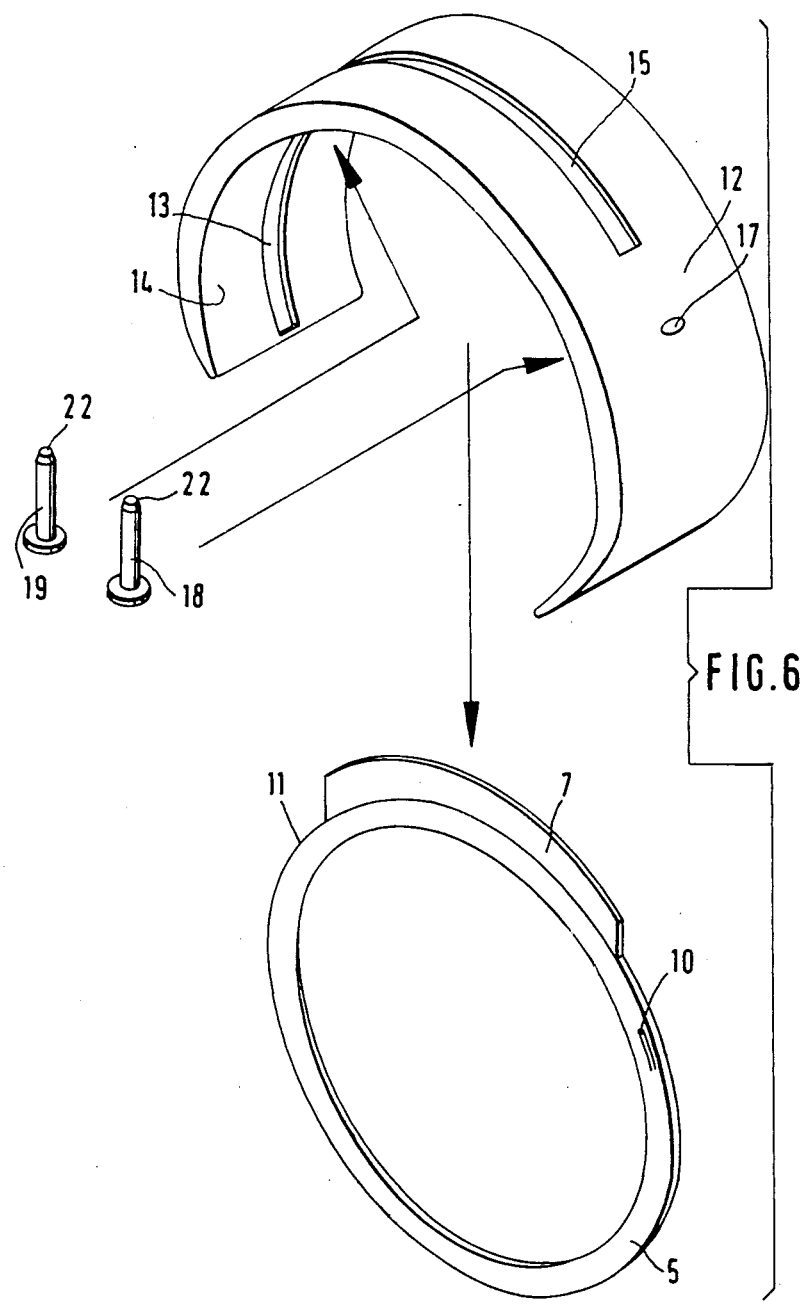
FIG. 6 is an exploded perspective view showing the combination of a finished disc and a saddle element to form a welding element.

As shown in FIG. 6, contact pins 18 and 19 can be inserted into holes 16 and 17 of the saddle and fastened to the free ends 10 and 11 of the wire coil with drops of solder 22. Appropriate clamps of a welding set (not shown) can be attached to the contact pins.

Figure 7:
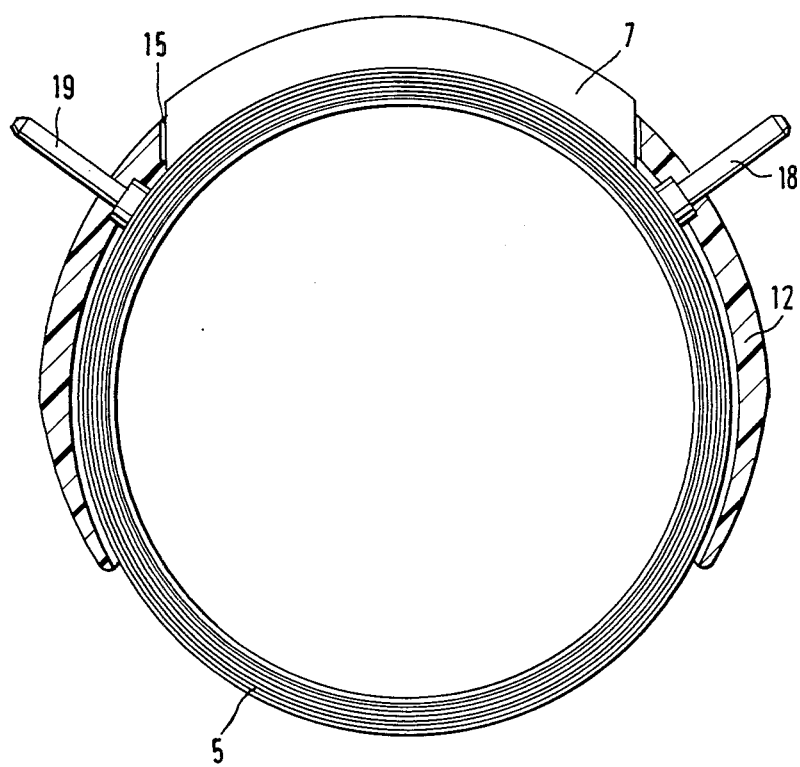
FIG. 7 is a cross-sectional view of a composed welding element.

FIG. 7 illustrates the assembled or combined welding element composed of annular disc 5 and saddle 12, with projection 7 of annular disc protruding through recess 15 in the saddle. A heated welding ridge can be pressed onto the projection 7 edge that protrudes out of recess 15, so as to soften the projection edge and press it flat, so that a permanent connection is created between annular disc 5 and saddle 12. FIG. 7 also shows the arrangement of contact pins 18 and 19, which ensure the connection of the heating wire coil to annular disc 5 with a welding set (not shown).

Figure 8:
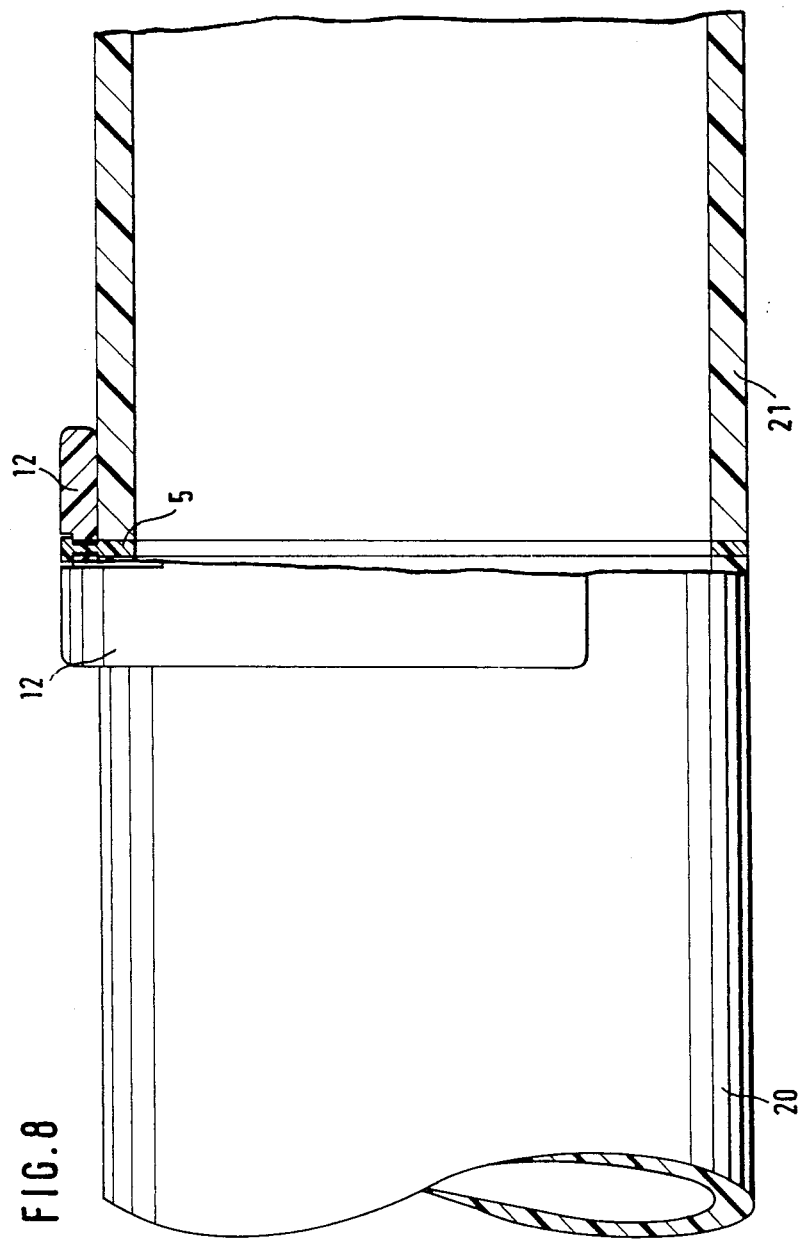
FIG. 8 is a side view, in part section, of two buttwelded tube ends that are to be welded together with an inserted welding element.

As shown in FIG. 8, the welding element created in this way can be used on two butt-welded tubes 20 and 21 that are in alignment. Annular disc 5 thereby extends into the joint between the abutting tube ends. The saddle 12 fixes the tube ends in the final position necessary for welding.

The welding element can remain on the tubing after the tube ends have been welded. However, steps can also be taken to eliminate the connection between the saddle element and the annular disc melted by the welding, so that the saddle element can be removed.

The saddle section can also be made from another material, so that it can be re-used if appropriate. In any case, the annular disc must be made out of a weldable material, or a material that can be softened by heat and which can bind the tube ends that are to be welded together.

While only one embodiment of the present invention has been described, it is obvious that many changes and modifications may be made thereunto, without departing from the spirit and scope of the invention.

What is claimed is:

1. A welding device for welding butt-welded plastic tubes comprising:
   a weldable plastic annular disc having opposing parallel side surfaces interposable between the ends of tubes to be butt-welded together so that each side surface is in contact with a tube end, the external diameter of the disc being approximately equal to the external diameter of the tubes and the internal diameter of the disc being approximately equal to the nominal internal diameter of the tubes;
   a spiral shaped groove formed in each opposing side surface of said annular disc spiralling in a direction around the geometric center of the disc and said spiral shaped grooves being interconnected at the radially innermost ends thereof; and
   a continuous heating wire coil clamped in said spiral shaped groove and extending from one said side surface to the other said side surface.

2. The welding device according to claim 1, which further includes a saddle shaped receptacle, and wherein said annular disc has a projection thereon and said receptacle has a recess therein through which said projection extends so that an edge of said projection extends from the receptacle, and connection elements on said annular disc and said receptacle engageable with one another.

3. The welding device according to claim 2, wherein said saddle shaped receptacle has an inner surface in which is formed a channel to accept the annular disc, the width of said channel being greater than the thickness of the annular disc.

* * * * *